United States Patent
Desantis et al.

(10) Patent No.: US 8,938,672 B2
(45) Date of Patent: Jan. 20, 2015

(54) AMENDING THE DISPLAY PROPERTY OF GRID ELEMENTS

(75) Inventors: Robert Desantis, San Jose, CA (US); Robert Kickhofel, Los Gatos, CA (US); Jia Yuan Ni, Jiang Kou Town (CN)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 12/264,339

(22) Filed: Nov. 4, 2008

(65) Prior Publication Data

US 2010/0115390 A1 May 6, 2010

(51) Int. Cl.
G06F 17/24 (2006.01)
G06F 17/30 (2006.01)

(52) U.S. Cl.
CPC ........ *G06F 17/30905* (2013.01); *G06F 17/245* (2013.01)
USPC ........................................................ 715/273

(58) Field of Classification Search
CPC ........................................................ G06F 17/24
USPC ........................................................ 715/273
See application file for complete search history.

(56) References Cited

U.S. PATENT DOCUMENTS

| | | | |
|---|---|---|---|
| 5,506,951 A | 4/1996 | Ishikawa | |
| 6,628,312 B1 | 9/2003 | Rao et al. | |
| 6,741,997 B1 * | 5/2004 | Liu et al. | 1/1 |
| 7,180,500 B2 * | 2/2007 | Marvit et al. | 345/156 |
| 7,441,204 B2 * | 10/2008 | Thomson et al. | 715/827 |
| 7,831,902 B2 * | 11/2010 | Sourov et al. | 715/220 |
| 2003/0110191 A1 | 6/2003 | Handsaker et al. | |
| 2006/0107196 A1 * | 5/2006 | Thanu et al. | 715/503 |
| 2008/0046808 A1 * | 2/2008 | Malkin et al. | 715/228 |

OTHER PUBLICATIONS

China Office Action date Mar. 12, 2010 received in related patent application No. 200710153450.4.
FarPoint Spread for Windows Forms 3, http://www.fpoint.com/netproducts/spreadweb/whatsnew.aspx.
Max Henrion, What's Wrong with Spreadsheets—and How to Fix them with Analytica, http://www.lumina.com/dlana/papers/Whats%20wrong%20with%20spreadsheets.pdf, Jul. 14, 2004, p. 1-13, Lumina Decision Systems, Inc., CA 2004.

* cited by examiner

*Primary Examiner* — Adam Queler
*Assistant Examiner* — Tionna Burke
(74) *Attorney, Agent, or Firm* — Yudell Isidore PLLC; Jill Poimboeuf (57) ABSTRACT

The present invention relates to a method and system for amending a display property of a grid element. The method for amending a display property of a grid element comprises: receiving a command to amend the display property of at least one grid element; searching grid elements associated with said grid element; amending the display property of said grid elements and said associated grid elements. The present invention improves the operation of adjusting the display property of the grid, and enhances the operational efficiency and feasibility.

17 Claims, 7 Drawing Sheets

| | | All Has Nuts | | | | All All Pr fal |  |
|---|---|---|---|---|---|---|---|
| Date Opened | Chocolate Type | All Time(Fiscal) | 2000 | 2001 | 2002 | All Time(Fiscal) | 2000 |
| All Date Opened | All Chocolate Type | 101285414.803 | 473135 | 18488088.2 | 44428836.924 | 12701762.605 | 106385 |
| | Dark | 2683862.103 | 18962 | 549107.6 | 1151500.383 | 2683862.103 | 1896 |
| | Milk | 62806523.673 | 130258 | 10659546.525 | 28058608.811 | 6577685.86 | 59005 |
| | Not Chocolate | 31928327.485 | 295497 | 6428544.925 | 13583763.396 | | |
| | White | 3866701.542 | 28418 | 850889.15 | 1634964.334 | 3440214.642 | 284 |

FIG. 1

| | | | All Has Nuts | | | All All Products<br>false | | |
|---|---|---|---|---|---|---|---|---|
| Date Opened | Chocolate Type | All Time(Fiscal) | 2000 | 2001 | 2002 | All Time(Fiscal) | 2000 | 2001 |
| All<br>Date Opened | All Chocolate Type | 101285414.803 | 473135 | 18488088.2 | 44428836.924 | 12701762.605 | 106385.5 | 2726176.95 |
| | Dark | 2683862.103 | 18962 | 549107.6 | 1151500.383 | 2683862.103 | 18962 | 549107.6 |
| | Milk | 62806523.673 | 130258 | 10659546.525 | 28058608.811 | 6577685.86 | 59005.5 | 1477399.4 |
| | Not Chocolate | 31928327.485 | 295497 | 6428544.925 | 13583763.396 | | | |
| | White | 3866701.542 | 28418 | 850889.15 | 1634964.334 | 3440214.642 | 28418 | 699669.95 |

FIG. 2

| | | | All Has Nuts | | | All All Products<br>false | | |
|---|---|---|---|---|---|---|---|---|
| Date Opened | Chocolate Type | All Time(Fiscal) | 2000 | 2001 | 2002 | All Time(Fiscal) | 2000 | 2001 |
| All<br>Date Opened | All Chocolate Type | | | | | | | 726176.95 |
| | Dark | | | | | | | 549107.6 |
| | Milk | | | | | | | 1477399.4 |
| | Not Chocolate | | | | | | | |
| | White | | | | | | | 99669.95 |

New Header Attribute [X]

Header Attribute Name (required):(f)
"Time (Fiscal)"="All Time (Fiscal)"

Width
150

Height

Header Attribute will be applied to cells using the scope(s):
1:{"[QCC_2004],[Time(Fiscal)]","(QCC_2004),
[Time(Fiscal)],[All Time (Fiscal)]"}

[ OK ] [ Cancel ] [ Apply ] [ Help ]

|  |  |  | All Has Nuts | | | All All Prc fals | |
|---|---|---|---|---|---|---|---|
| Date Opened | Chocolate Type | All Time(Fiscal) | 2000 | 2001 | 2002 | All Time(Fiscal) | 2000 |
| All Date Opened | All Chocolate Type | 101285414.803 | 473135 | 18488088.2 | 44428836.924 | 12701762.605 | 106385 |
|  | Dark | 2683862.103 | 18962 | 549107.6 | 1151500.383 | 2683862.103 | 1896 |
|  | Milk | 62806523.673 | 130258 | 10659546.525 | 28058608.811 | 6577685.86 | 59005 |
|  | Not Chocolate | 31928327.485 | 295497 | 6428544.925 | 13583763.396 |  |  |
|  | White | 3866701.542 | 28418 | 850889.15 | 1634964.334 | 3440214.642 | 284 |

AMENDING THE DISPLAY PROPERTY OF GRID ELEMENTS

BACKGROUND OF THE INVENTION

1. Technical Field

The present invention generally relates to the computer field, and more particularly to a method and system for amending the display property of grid elements.

2. Description of the Related Art

A multi-dimensional grid and a spreadsheet are common data analysis tools, wherein the data are always associated with each other. For example, a member of a multi-dimensional grid, when expanded, can be displayed as many instances (columns/rows with the same name or meaning). The user can browse the data in a multi-dimensional grid or a spreadsheet to conduct data analysis.

When a multi-dimensional grid and a spreadsheet render data, the display form of elements thereof might not be able to meet requirements of a user. As a result, the user usually needs to customize the properties of respective grid according to his/her requirements. For example, when data to be displayed is too long, the size of a data cell might not be big enough to display it completely. As such, the size of the grid needs to amend to display the data completely.

A first known solution for resizing is using Microsoft Excel. Grid resizing in spreadsheet applications like Microsoft Excel is to resize columns or rows separately, not to resize by members. In addition, in most cases, current Microsoft Excel is not used as a web-based application or as an ActiveX component, nor distributed across the network and using client/server technology in a network environment.

A second known solution for resizing is by resizing a grid in a web-based multi-dimensional spreadsheet. In most web grid solutions (even using AJAX technology), resizing is based on setting sizes for columns or rows separately, and it is neither used for resizing members nor dealing with multi-dimensional hierarchy or parent members. The currently known solutions have some drawbacks. For solutions of resizing on columns or rows without using member, since the association between members is not utilized, it is inefficient and inconvenient due to repeated operations to adjust separately all the columns/rows with the same member name to the same size. Moreover, sizes of grid elements in different member hierarchies are not handled accordingly after data navigation like drill up, drill down or pivot. If sizes of grids at a parent hierarchy have been set, the sizes of grids at the sub-hierarchy will not be affected after drill up or drill down. However, the interaction may occur if resizing is based on separately setting sizes for columns or rows. Most grid resizing methods can not be applied to the multi-dimensional grid, for it can neither handle resizing in a multi-dimensional hierarchy, nor process the size of a parent member.

In a large analytical statement like a banking data analytical statement, it is required to display the loans of its outlets by year, the header column has two rows: one being the organization dimension and the other being time dimension (year). A combination of an outlet with a specific year corresponds to a column. Since the bank may have thousands of outlets, there must be thousands of members to spread in the organization dimension, and the grid must display thousands of columns. If it is required to resize the width of a column representing a year like 2002 uniformly but separately to a width like 200 pixels, it would be rather inefficient and inconvenient. Therefore, a solution, by which if only the display property of one column/row of a grid is adjusted, then the display property of all the associated columns/rows are automatically adjusted to the same parameter, is needed.

SUMMARY OF THE INVENTION

A method and system for amending a display property of a grid element. Since current solutions on grid adjustment do not fulfill efficiently and conveniently end users' needs for customizing the property on a grid, the present invention intends to optimize the operation of changing grid property and improve the efficiency and convenience.

According to one aspect of the present invention, a method for amending a display property of a grid element is provided, the method comprising receiving a command to amend the display property of the grid element; searching grid elements associated with said grid element; and amending the property of said grid element and its associated grid elements.

According to another aspect of the present invention, a system for amending a display property of grid elements is provided, the system comprising a receiving device for receiving a command to amend the display property of the grid element; a searching device for searching grid elements associated with said grid element; and an amending device for amending the property of said grid element and its associated grid elements.

According to the present invention, when a user needs to amend the display property of a grid element, not only the display property of the designated element is amended, those of other elements associated with the designated element are also amended accordingly. This is why the present invention is quite efficient and convenient for users to amend the display property of a multi-dimensional grid or a spreadsheet.

For a web-based multi-dimensional grid (generally DHTML (dynamic HTML) at client side), a user may desire to customize the grid element based on his/her preference, which is especially helpful when handling data operations like drill up/down, or pivot. The present invention handles resizing based on the association between dimensional hierarchies and resizes all instances of a member. The present invention can also handle simultaneously the resizing for hierarchy members in a tuple or a parent member in the same dimensional hierarchy.

Furthermore, the server in the present invention optimizes the resizing performance, for example, the program at server side will make a statistics for the grid elements affected by the resizing and decide what to be sent to the client (entire grid, partial grid, etc) for good performance.

Furthermore, the present invention restores the scrolled position after resizing and keep the user's current window position unchanged so as to further improve the convenience.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method and a system for amending a display property of a grid element. In the present invention, grid is a multi-dimensional one used in a data analysis application. A multi-dimensional grid has a plurality of header columns or rows displayed in a hierarchy. Each header column or row is regarded as a dimension, and an element in a dimension is a member. A member could be displayed as many instances (columns/rows with the same name) when it is expanded. A tuple is the unique combination of multiple members from different dimensions.

Figure 1:
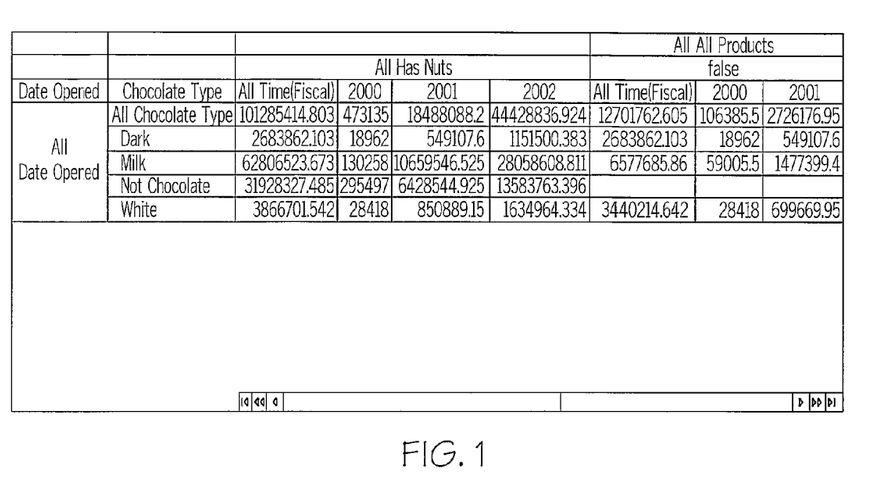
FIG. 1 is a schematic diagram of a multi-dimensional grid before resizing.

With reference now to FIG. 1 there is a schematic diagram illustrating a multi-dimensional grid before resizing in which the present invention may be implemented. The current size for Member "All All Products: All Has Nuts: All Time (Fiscal)" is 100. The unit for all the width or heights concerned in the context is "px". With reference to FIG. 1, the grid contains dimensions like "Product", "Has Nuts", "Time (Fiscal)", "Date Opened" and "Chocolate Type", wherein the Dimension "Time (Fiscal)" has 4 members: "All Time (Fiscal)", "2000", "2001" and "2002"; and the Dimension "Chocolate Type" has 5 members: "All Chocolate Type", "Dark", "Milk", "Not Chocolate" and "White". In the grid, "All All Products: All Has Nuts: All Time (Fiscal)" forms a tuple, and "All All Products: false: All Time (Fiscal)" forms another tuple.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 2:
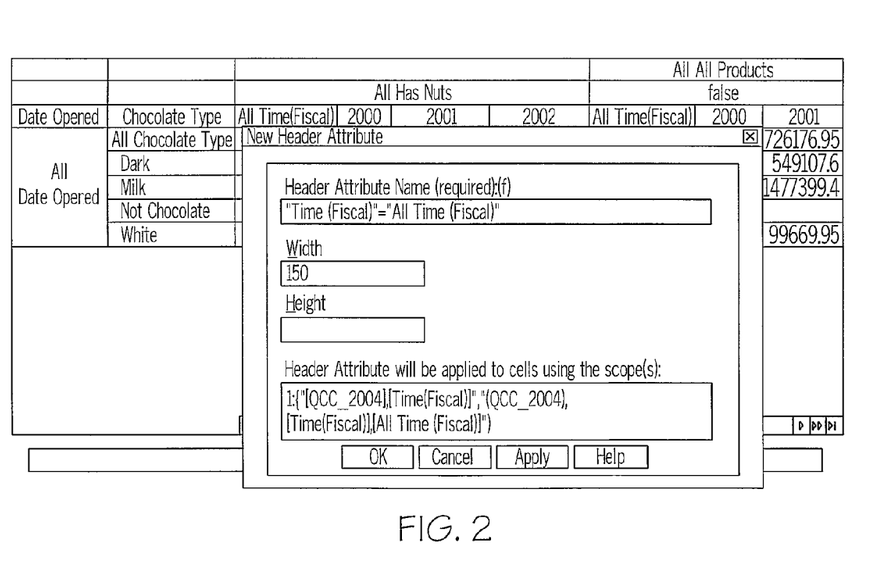
FIG. 2. is a schematic diagram of a dialogue box to enter the size for amending grid elements.

FIG. 2 is a schematic diagram illustrating a dialogue box to enter the size for amending grid elements, wherein the size of a member "All All Products:All Has Nuts: All Time(Fiscal)" is resized to "150".

Figure 3:
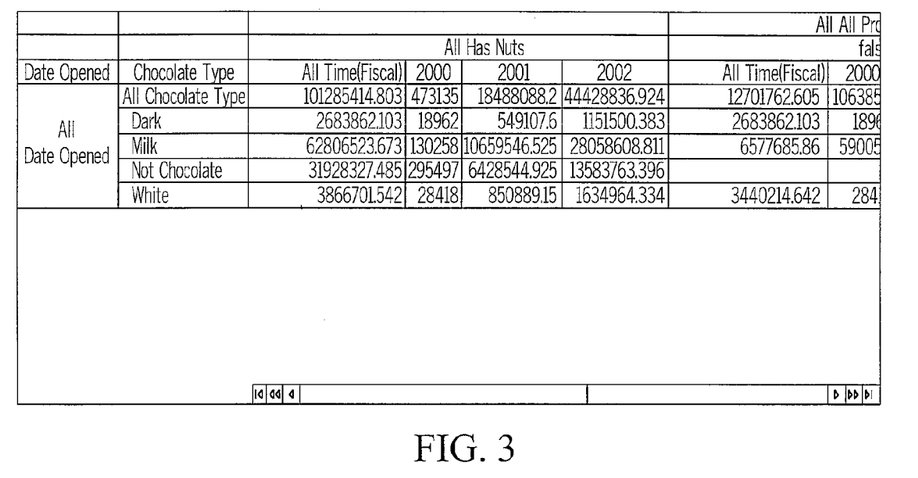
FIG. 3. is a schematic diagram of a multi-dimensional grid after resizing.

FIG. 3 is a schematic diagram of a multi-dimensional grid after resizing, wherein all the members "All Time(Fiscal)" under the dimension "Time(Fiscal)" have been resized to 150, for example, the column where "All All Products: All Has Nuts: All Time(Fiscal)" lies and the column where "All All Products: false: All Time(Fiscal)" lies. FIGS. 1-3 illustrate a demonstrative effect of amending the display property of grid elements.

Figure 4:
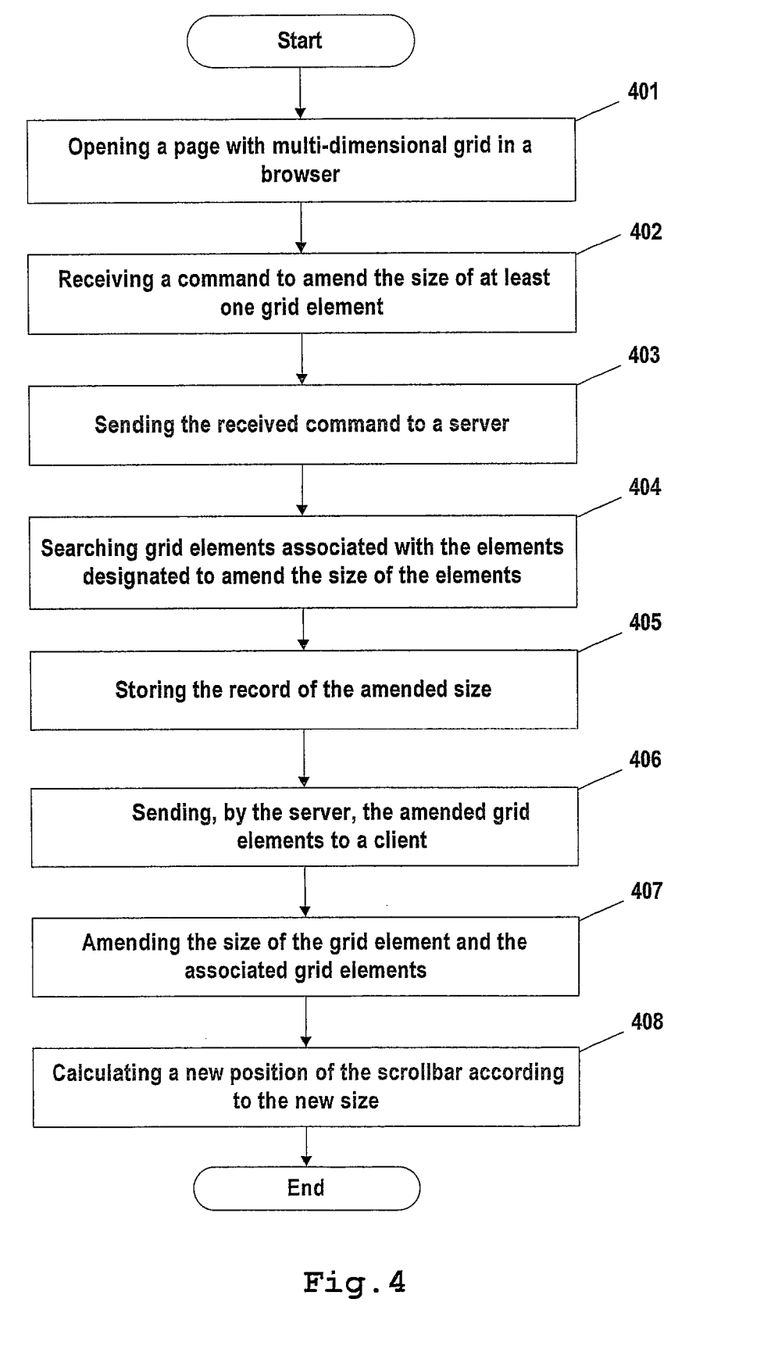
FIG. 4 is a flow chart illustrating a method for amending the display property of grid elements in accordance with one embodiment of the present invention.

FIG. 4 is a flow chart illustrating a method for amending the display property of grid elements in accordance with one embodiment of the present invention. In step 401, a page with multi-dimensional grid is opened in a browser. Said multi-dimensional grid displays data and can handle data operations like drill up, drill down, pivot, and display/hide, etc. It should be understood that when the a multi-dimensional grid is displayed in the browser, all the information on the multi-dimensional grid, including each dimension, member, tuple, data, etc., are kept in a server providing data analysis service.

In step 402, a command to amend the size of a grid element is received. The user can drag the boundary of a header cell or data cell using a mouse to define a new size, or the user can enter a new size value in the dialogue box as illustrated in FIG. 2. It should be understood that the user can define a new size to multiple members (for example, multiple columns or rows) simultaneously.

In step 403, the browser sends the command received to the server. This step can be realized in the following means: Adding an event "SizeChangedEvent" to send information from client to server. Transmitting information between the client and the server by JavaScript, HttpRequest and XML request.

SizeChangedEvent is contained in XML and sent from client to server by HttpRequest. It is also parsed and dispatched to a proper event processor, like controllers, to process the "size-changed-action". A "Change Request" can have a structure, such as:

Component: The to-be-resized grid ID is dragged, the ID being generated at server side, stored therein, and sent to the client when the display grid is generated Direction: it is indicated whether it is to resize columns or rows, 0 indicating columns, 1 indicating rows. If no columns or rows are designated, it is determined whether the cell represented by a component is a column or a row.

Sizechanged-UIDS: UIDs of the header cells UID to be resized is stored(delimited with commas for multiple UIDs)

Sizechanged-sizes: the target size of columns or rows is stored (delimited with commas for multiple sizes, and corresponding to Sizechanged-UIDs).

Sizedcell_position_info: the position information before resizing is stored for restoring its position, and the position information should be a character string delimited by commas, for example:

arr[1]: Sized cell row index, the index being counted from the header, the first row being 0;

arr[2]: Sized cell column index, the index is counted from the header, the first column being 0;

arr[3]: the horizontal offset position (offsetLeft) of the cell in a data cell window (excluding the header row or header column). If the cell is a row header, the value should be −1;

arr[4]: the vertical offset position (offsetTop) of the cell in a data cell window (excluding the header row or header column). If the cell is a column header, the value should be −1;

arr[5]: the offset position of the horizontal scrollbar in the current grid window;

arr[6]: the offset position of the vertical scrollbar in the current grid window.

For example, if the right boundary of the header cell All All Product: All Has Nuts: All Time (Fiscal) (the ID for the cell is 1010) is dragged to expand its width into 150 pixels, then the size-change request generated there from can be demonstrated as below:

```
<request>
    <Component>1010</Component>
    <Direction>0</Direction>
    <Sizechanged-UIDS>1010</Sizechanged-UIDS>
    <Sizechanged-sizes>150</Sizechanged-sizes>
    <Sizedcell_position_info>-1,2,0,-1,0,0</Sizedcell_position_info>
>
</request>
```

The above structure for change request is only a preferred embodiment, and the skilled in the art can define other similar structures based on the above structure to perform the same function.

In step 404, upon receiving the change request, the server will parse the information and retrieve the change command designated by the user, such as scope and new changed values, etc. Afterwards, the server searches the grid elements associated with the changed elements being designed. For example, searching the tuple of other members that have the same name as the members to be resized. After the associated tuples are searched, the header cell and data cell in the tuple is set to a new size. Meanwhile, the size of the header cell in the hierarchy is set accordingly, and the members at the upper hierarchy in the same tuple with the members are resized. Detailed description of this part will be conducted with reference to the accompanying drawings.

In step 405, amendment record is stored. For example, storing the original and new sizes, amending the application scopes and amending formats of properties. When the user desires to repeat the same amendment or restore to its former format, the user can click on the amendment record to perform the application action. Moreover, when a grid is created or rebuilt, the stored property can also be applied to the grid. The stored format can have the following structure:

The format is stored as a string as below:
group="name1",width="100",scope="{Product: coke}"
1. the record name group is stored, which can be ignored or generated based the scope
2. width: the designated new width. Cells are only applied in columns. Specific information can be used to indicate to hide the cells.
3. height: the designated new height. Cells are only applied in rows. Specific information can be used to indicate to hide the cells.
4. Scope: the designated size application scope.
The scope is specified as below"
Scope={d0:m00[,m01, . . . m0n]}{d1:m10[,m11, . . . m1n]} . . . ]
Wherein d0, d1 denote dimensions, and m00, m01, m0n m11 and m1n denote a members within the dimensions.
For example, for Essbase (a multiple dimensional dada management software product) data sources:
Scope={Product:coke}{Scenario: Acutal: budget}
Wherein, Product and Scenario are names of dimensions. Coke is a member of Product, and Actual and budget are members of Scenario.
For Microsoft Analysis Services (Microsoft Analysis: a multiple dimensional data management software product from Microsoft Inc.) or SAP BW (another multiple dimensional data management software product) data sources, a unique name is used as follows:

Scope={[Product]:[Product].[code]}{[Scenario]:[Scenario].[Actual],[Scenario].[Bud get]}

The above multi-dimensional management software products provide functions of storing data and searching data in a multi-dimensional format.

As shown in FIGS. 1-3, The command record after resizing should take the form as below:
group="All Time(Fiscal)",width="150",scope="{Time (Fiscal): All Time(Fiscal)}"

In step 406, the changed grid cells are sent from the server to the client. When a cell is changed in its size, the change is registered in the change registry of grid. When creating a response message for XML request, the size changed cells to be rendered are generated with td (cell) or th (header cell) tag of an HTML language. Such changes are contained in a text string to send to the client through AJAX technology.

In step 407, the browser, upon receiving new sizes, amends the sizes of grid elements designated by the user and of the associated cells. In the client, the browser dispatches the response message and identifies all cells to update. Replace each td or th tag with new ones for each cell required to update. Then the grid is adjusted and aligned slightly.

Thus, in the present invention, when the size of a member is designated to change, not only is the member designated by users updated, but also the members associated therewith are updated. This avoids unnecessarily repeated operations on the associated members during data analysis process.

In step 408, the scrollbar's new position is calculated according to the new size. The scrollbar indicates the percentage of the current grid cell over the total height/width. When the size of a data spreadsheet element is updated, the total width/height is correspondingly updated. And the scrollbar's position is also updated accordingly to correspond to the new size such that the position of the current user window keeps unchanged before and after the grid's size is changed.

Figure 5A:
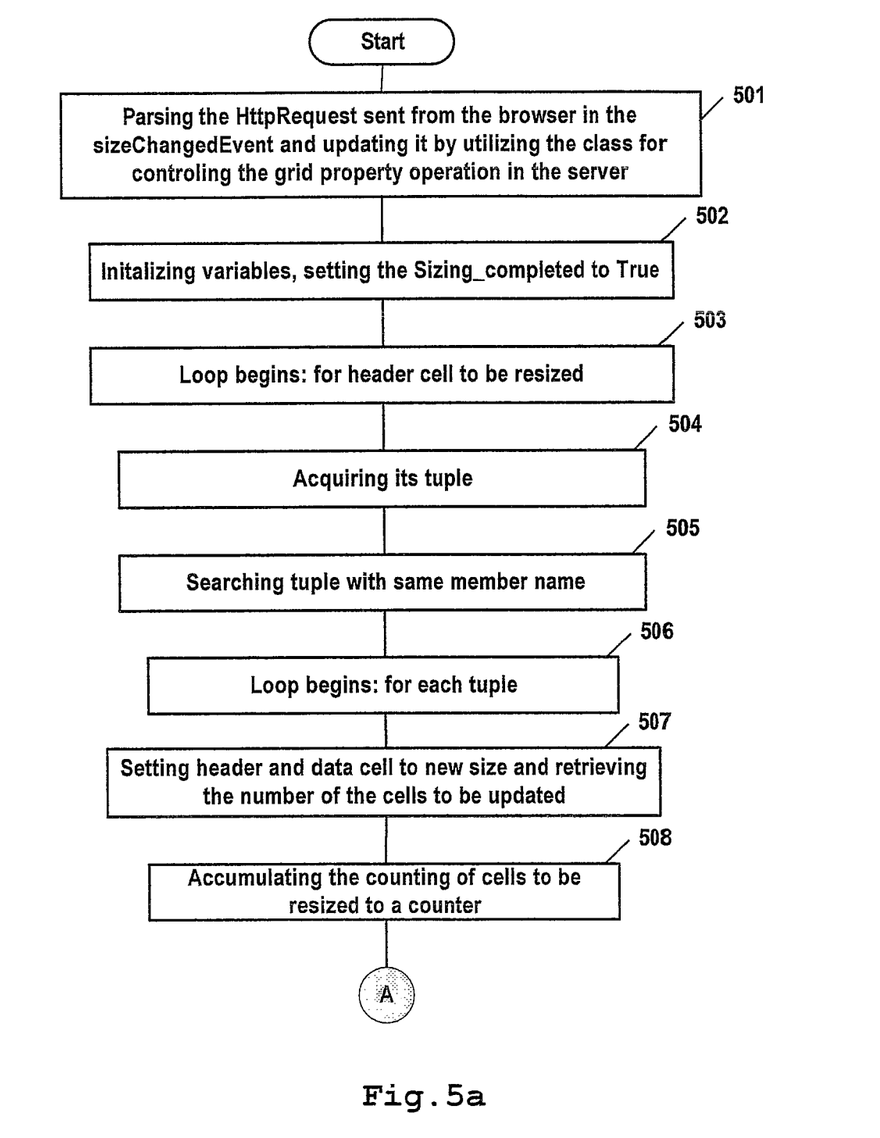
FIGS. 5a & 5B are detailed flow charts for searching the cells to be amended and amending the size of grid cells.
Figure 5B:
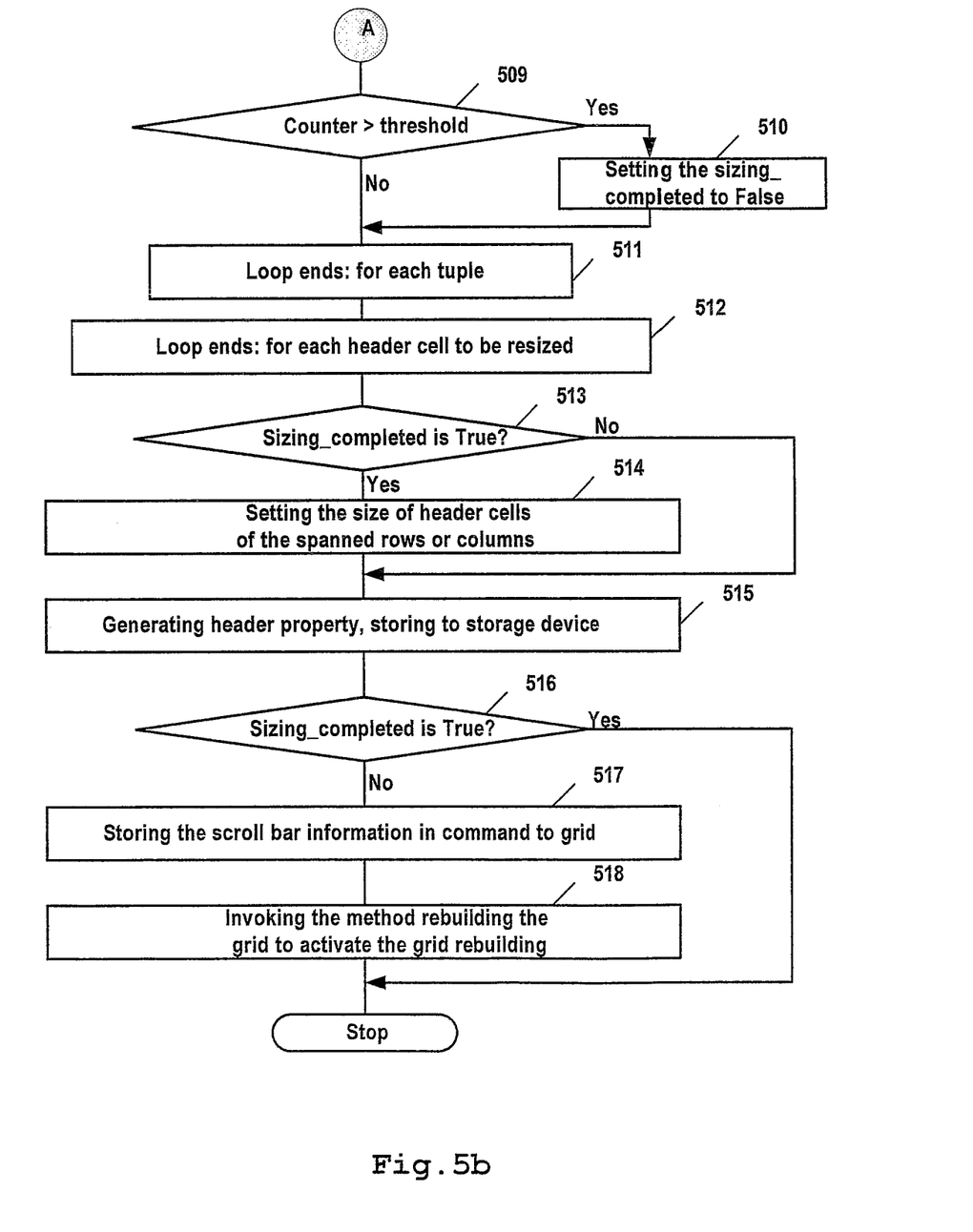

FIGS. 5*a* and 5*b* are detailed flow charts for searching the cells to be amended and amending the size of grid cells. It should be understood that the flow illustrated in FIGS. 5*a* and 5*b* are only an embodiment of Steps 404-406 in FIG. 4. The server, upon receiving the amendment information, searches the grid elements associated with said elements and then sends the amendment for the size of the associated grid elements to the client. This operation can be realized in various ways.

In step 501, firstly, the HttpRequest sent from the browser in the sizeChangedEvent is parsed and updated by utilizing the class for controlling the grid property operation in the server. In step 502, variables are initialized, in particular, setting the flag Sizing_Completed indicating that all the size updates have been successfully completed to "true". In step 503, since the user can designate simultaneously resizing multiple members, loop goes to step 512 for each header cell to be resized. In a multi-dimensional grid, the header cell can be located in multiple tuples. Thus, all its tuples are obtained in step 504. In Step 505, tuples with the same member name as the resized header cells are searched among all the tuples. In step 506, loop begins: loop goes to step 511 for each tuple with the same member name.

In step 507, header and data cells of each tuple with the same member name are set to a new size and a statistics for the number of cells to be updated is made. In step 508, the counting of cells to be resized is accumulated to a counter. In Step 509, it is determined whether the counter is larger than a threshold value. The threshold value can be set to, for example, 500, based on the browser's response time. The purpose of determining whether the number of cells exceeds the threshold value is to improve the system's performance. If the number of cells to be resized is too big, it would be very slow for the browser to update the grid, even the system would break down or memory overflow would occur. If the update speed is too slow, it will be preferable to refresh the whole grid.

If the number of cells to be resized exceeds the threshold value, "Sizing_Completed" is set to "false" in step 510. In step 511, the loop for each tuple ends. In step 512, the loop for each header cell to be resized ends. Next, it is determined whether the "Sizing_Completed" is true in step 513. If the Sizing_Completed is true, in step 514, the size for spanned row or column headers is set. If Sizing_Completed is false, step 515 is directly executed. In step 515, the record of adjusting the size property is generated and stored in the storage device. In step 516, whether "Sizing_Completed" is true is determined. If Sizing_Completed is true, the process ends. If Sizing_Completed is false, the following steps are executed to update the whole grid. In step 517, the scrollbar information in the command is stored in the grid. In step 518, the method rebuilding the grid is invoked to activate the grid rebuilding.

What has been described herein is illustrative of the method of the invention with resizing grid elements as the example. It should be understood that the invention is not limited to resizing grid elements. The present invention can also be applied to amend other display property of grid elements, such as font, size, color, foreground/background color, line property, etc.

Furthermore, in the above embodiments, the determination of associated members is conducted in the server. It is also possible to realize the determination of associated members in the client (browser). For example, if the contents of header cells in tuples are the same, it can be determined that they are associated members. Of course, such means may be inaccurate. For members with same header contents may not be associated. The server providing multi-dimensional services contains Information on the associated members, so the determination made at the server side is accurate. Another method for determining associated members in the client can drop the identifier (id) of the member information in the server to the header cell in the client, and then determine the associated members based on the fact that the same members should have same identifier (id).

What is described above is the implementation of the invention in the client/server environment. The invention can also be applied to a spreadsheet in stand-alone or network environment. Moreover, multiple rows or columns can be set as header rows or columns to simulate a multi-dimensional grid. Below is the explanation on how to realize the present invention in a spreadsheet.

In the existing spreadsheet, the rows/columns or cells have no association there between. In the present invention, a property can be added to each row/column or cell of a spreadsheet to designate other elements associated with the grid element. Of course, the contents of header row/column can be determined. If their contents are the same, they can be determined as associated rows/columns.

Upon a display property of a spreadsheet element is amended, other associated elements are obtained. Then the property of associated elements will be amended likewise, which simplifies the process for the user to amend the property of associated elements.

Figure 6:
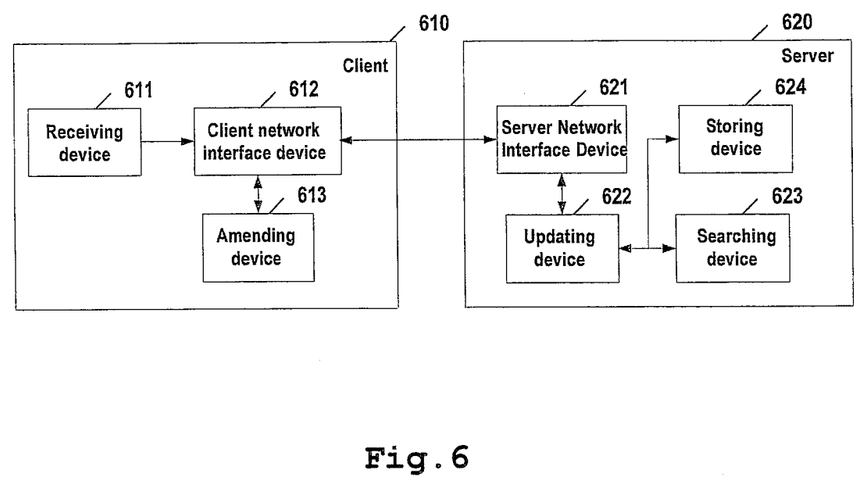
FIG. 6 is a block diagram illustrating a system for amending the display property of grid elements in accordance with one embodiment of the present invention.

FIG. 6 is a block diagram illustrating a system for amending the display property of grid elements in accordance with one embodiment of the present invention. FIG. 6 illustrates a system comprising a client 610 and a server 620. The client 610 comprises a receiving device 611, a client network interface 612 and an amending device 613. The server 620 comprises a server network interface 621, an updating device 622, a searching device 623 and a storing device 624.

Upon the browser in the client 610 displaying a multi-dimensional grid, the receiving device 611 receives a command to amend the display property of a multi-dimensional grid element. Afterwards, the client network interface 612 sends the received command via HttpRequest to the server network interface 621. The updating device 622 of the server 620 first parses the received command and searches, via the searching device 623, a member having the same name with the members of amended grid as the associated member. The updating device 622 updates the property of grid elements designated to update by the user and the property of associated grid elements. Afterwards, the updating device 622 contains the change to all the elements into a text string and send it to the client network interface 612 via for example AJAX technology. The amending device 613 of the client 610 identifies all the grid elements required to update based on the received amendment command. For each grid element required to update, each td or th is replaced with new ones to amend the property of the grid element and said associated grid elements.

Moreover, the updating device 622 of said server 620 further determines the number of associated grid elements; if the number exceeds the preset value, the whole grid with new property is sent to the client 610. Then the amending device 613 of the client 610 updates the whole grid.

Moreover, when said grid is a multi-dimensional grid and said property is size of the grid element, said updating device 622 further calculates the new size of the grid element where the member in an upper dimension of the tuple lies; and the amending device 613 accordingly amends the size of the grid element where the member in an upper dimension of the tuple lies.

Moreover, when said property is size of a grid element, said updating device 622 calculates the new position of the scrollbar according to the new size; and the amending device 613 updates the scrollbar according to the new position to keep the position of the user's current window unchanged before and after updating.

The server 620 further comprises a storing device 624 for storing the record of amended property. In this way, when the user needs to create or rebuild a grid, the property stored in the storing device 624 can be obtained and the amending device 613 will apply the stored property to the grid.

Figure 7:
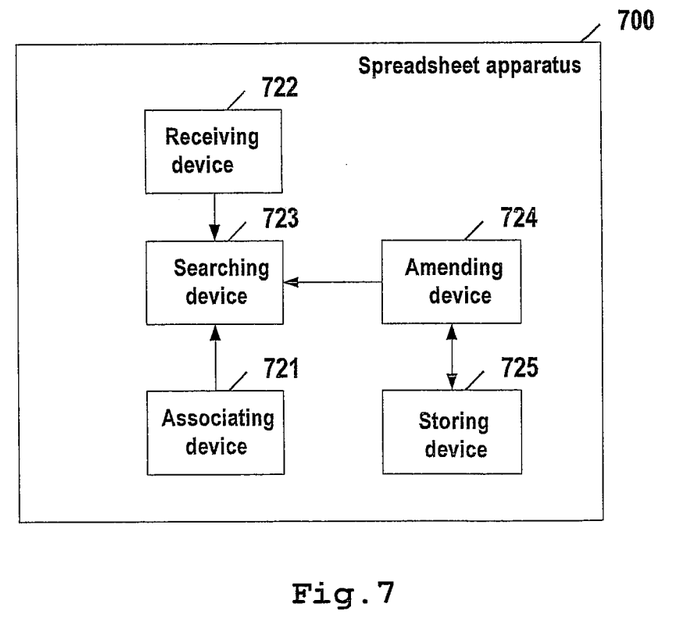
FIG. 7 is a block diagram illustrating a system for amending the display property of grid elements in accordance with another embodiment of the present invention.

FIG. 7 is a block diagram illustrating a system for amending the display property of grid elements in accordance with another embodiment of the present invention. This embodiment illustrates the scenario under which the present invention is applied to the spreadsheet.

A spreadsheet apparatus 700 can be a stand-alone spreadsheet or a spreadsheet working in network environment. In this embodiment, Only the stand-alone spreadsheet is used as an example for illustration. The spreadsheet apparatus 700 comprises a associating device 711, a receiving device 712, a searching device 713, an amending device 714 and a storing device 715.

The associating device 711 designates rows/columns or cells in a grid to be associated elements. The receiving device 712 is used for receiving a command to amend the property of a grid element. The searching device 713 searches grid elements associated to said elements based on the association designated by the associating device 711. Afterwards, the amending device 714 amends the property of said grid elements and of said associated grid elements. The storing device 715 is used for storing the record of amended property.

When a grid is created or rebuilt, the properties stored in the amending device 714 can also be applied to the grid.

Figure 8:
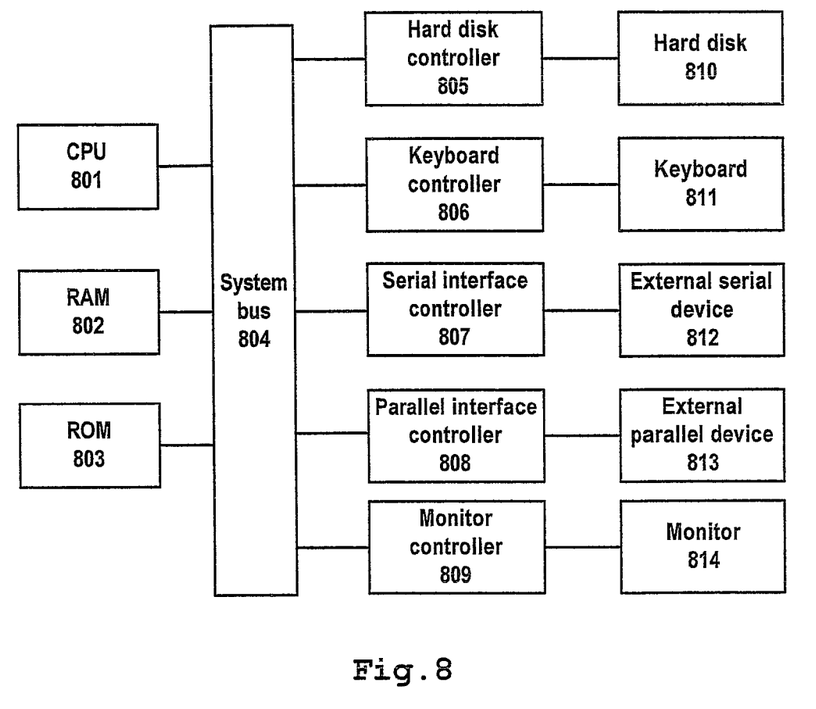
FIG. 8 is a block diagram illustrating a computer system suitable to implement the present invention.

FIG. 8 is a block diagram illustrating a computer system suitable to implement the present invention. The computer system illustrated in FIG. 8 comprises a CPU (Central Processing Unit) 801, a RAM (Random Access Memory) 802, a ROM (Read-only Memory) 803, a system bus 804, an hard disk controller 805, a Keyboard controller 806, a serial interface controller 807, a parallel interface controller 808, a monitor controller 809, a hard disk 810, a keyboard 811, an external serial device 812, an external parallel device 813 and a monitor 814. Among these devices, connected with the bus 804 are the CPU 801, the RAM 802, the ROM 803, the hard disk controller 805, the keyboard controller 806, the serial interface controller 807, the parallel controller 808 and the monitor controller 809. The hard disk 810 is connected with the hard disk controller 805; the keyboard 811 is connected with the keyboard controller 806; the external serial device 812 is connected with the serial interface controller 807; the external serial device 813 is connected with the parallel interface controller 808; and the monitor 814 is connected with the monitor controller 809.

The function of each device in FIG. 6 is known in the field, and the structure illustrated in FIG. 6 is also conventional. This structure is not only applied in a personal computer, but also in a portable device, like Palm PC, PDA (Personal Digital Assistant) and mobile phone, etc. In various applications, for example, for realizing a user terminal containing the client module of the present invention or a server host computer containing the network application server of the present invention, some members can be added in the structure illustrated in FIG. 6, or some members in FIG. 6 can be omitted. The whole system shown in FIG. 6 is controlled by computer readable instructions generally stored in the hard disk 810 or stored in EPROM or in other non-volatile memory as software. The software can also be downloaded from network (not shown in the figure). It can also be stored in hard disk 810, or the software downloaded from network can also be loaded to RAM 802 and executed by CPU 801 to perform the function defined by the software.

Though the computer system described in FIG. 6 can support the scheme for off-line use based on the network contents provided by the invention, said computer system is only exemplary of a computer system. The skilled in the art can understand that many other computer system designs can also realize the embodiments of the present invention.

The present invention can also be realized into a computer program product like that used by the computer system shown in FIG. 6 for instance, which can contain the code of network application server for implementing the network contents provision according to the invention for off-line use; and which can also contain the code of client module for implementing the network contents acquisition according to the invention for off-line use. Before used, the code can be stored in a memory of other computer system (e.g., a hard disk or a removable storage device like a CD or a floppy disk), or the code can be downloaded via an Internet or via other computer networks.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for amending a display property of a grid element, the method comprising:
   receiving a command to amend the display property of at least one grid element within a multi-dimensional grid, the multi-dimensional grid having a plurality of grid elements, wherein the multi-dimensional grid has at least one of a plurality of header columns and a plurality of header rows displayed in a hierarchy, wherein each header column and header row is a dimension, and wherein each dimension comprises one or more grid elements;
   searching within the multi-dimensional grid for one or more other grid elements that are associated with the at least one grid element;
   in response to locating the associated one or more other grid elements, a processor amending the display property of the at least one grid element and the associated one or more other grid elements; and
   in response to receiving a designation to simultaneously amend a display property of a plurality of members having a same member name:
     acquiring a first tuple associated with a first header cell;
     searching among all tuples in the multi-dimensional grid for one or more tuples having a same member name as the first header cell, wherein a member is a grid element in a dimension that is displayed in one or more instances when expanded, wherein a header cell is located in one or more tuples, and wherein a tuple is a combination of multiple members from a plurality of dimensions; and
     updating a header and a data cell within each of the one or more tuples having the same member name as the first header cell.

2. The method according to claim 1, further comprising:
   sending the received command to a server;
   enabling a search at the server of the associated one or more other grid elements associated with the at least one grid element; and receiving, from the server, an amendment to the display property of the associated one or more other grid elements.

3. The method according to claim 2, further comprising:

making a statistics for a number of the associated grid elements, wherein the server sends the entire multi-dimensional grid with the amended display property as a new display property in response to a number of the associated one or more other grid elements exceeds a preset value; and in response to the server sending the multi-dimensional grid with the new property:
  receiving the multi-dimensional grid with the new display property at the client; and
  updating the multi-dimensional grid at the client.

4. The method according to claim 1, further comprising:

searching for one or more members having at least one of the same name and the same meaning as a plurality of members represented by the amended grid element in a same dimension hierarchy as the associated one or more other grid elements, wherein a member is a grid element in a dimension that is displayed in one or more instances when expanded;

receiving a designation of one or more grid elements to be the associated one or more other grid elements;

storing a record of the amended display property within a storage; and in response to the multi-dimensional grid being created or rebuilt, applying the stored property to the multi-dimensional grid.

5. The method according to claim 1, further comprising:

in response to the amended display property being a new size of the grid element, calculating a new position of a scrollbar according to the new size; and updating the scrollbar according to the new position to keep a current window indicated by the scrollbar unchanged before and after amending the display property.

6. The method according to claim 1, further comprising: in response to said the display property being a size of the at least one grid element:

calculating a new size of the at least one grid element where an associated member exists in an upper dimension hierarchy in a same tuple; and amending the size of the at least one grid element to the new size where the associated member exists in the upper dimension hierarchy;

wherein a member is a grid element in a dimension that is displayed within one or more instances when expanded.

7. A system for amending a display property of a grid element, the system comprising:

a processor;

a memory having logic embodied therein that when executed by the processor enables the system to:
  receive a command to amend the display property of at least one grid element within a multi-dimensional grid, the multi-dimensional grid having a plurality of grid elements, wherein the multi-dimensional grid has at least one of a plurality of header columns and a plurality of header rows displayed in a hierarchy, wherein each header column and header row is a dimension, and wherein each dimension comprises one or more grid elements;
  search within the multi-dimensional grid for one or more other grid elements that are associated with the at least one grid element;
  in response to locating the associated one or more other grid elements, amend the display property of the at least one grid element and the associated one or more other grid elements; and
  in response to receiving a designation to simultaneously amend a display property of a plurality of members having a same member name:
    acquire a first tuple associated with a first header cell;
    search among all tuples in the multi-dimensional grid for one or more tuples having a same member name as the first header cell, wherein a member is a grid element in a dimension that is displayed in one or more instances when expanded, wherein a header cell is located in one or more tuples, and wherein a tuple is a combination of multiple members from a plurality of dimensions; and
    update a header and a data cell within each of the one or more tuples having the same member name as the first header cell.

8. The system according to claim 7, the logic further comprising logic that when executed by the processor enables the system to:

send the received command to a server;

trigger a searching device of the server to search, at the server, for the associated one or more other grid elements associated with the at least one grid element; and receive, from an updating device of the server, an amendment to the display property of the associated one or more other grid elements as a new display property.

9. The system according to claim 8, the logic further comprising logic that when executed by the processor enables the system to:

determine the number of the associated one or more other grid elements, and if the number of the associated grid elements exceeds a preset value, sends the multi-dimensional grid with new display property to the client;

receive the multi-dimensional grid with the new display property; and in response to receiving, from the server, the multi-dimensional grid at the network interface device, update the multi-dimensional grid.

10. The system according to claim 7, the logic further comprising logic that when executed by the processor enables the system to:

designate one or more grid elements to be the associated one or more other grid elements; and search for members having at least one of the same name and meaning as a plurality of members represented by the amended grid element in a same dimension hierarchy as the associated one or more other grid elements, wherein a member is a grid element in a dimension that is displayed in one or more instances when expanded;

receive a designation of one or more grid elements to be the associated one or more other grid elements;

store a record of the amended display property within a storage; and in response to the multi-dimensional grid being created or rebuilt, apply the stored property to the multi-dimensional grid.

11. The system according to claim 7, the logic further comprising logic that when executed by the processor enables the system to:

in response to the amended display property being a new size of the grid element, calculate a new position of a scrollbar according to the new size; and update the scrollbar according to the new position to keep a current window indicated by the scrollbar unchanged before and after amending the display property.

12. The system according to claim 7, the logic further comprising logic that when executed by the processor enables the system to:
in response to the display property being a size of the grid element:
calculate a new size of the grid element where an associated member exists in an upper dimension hierarchy in a same tuple; and
amend the size of the at least one grid element to the new size where the associated member exists in the upper dimension hierarchy;
wherein a member is a grid element in a dimension that is displayed within one or more instances when expanded.

13. A computer program product comprising:
a non-transitory computer readable storage device; and
computer readable instructions stored on the computer readable storage device that when executed by a processor the program instructions cause the processor to perform the functions of:
receiving a command to amend the display property of at least one grid element within a multi-dimensional grid, the multi-dimensional grid comprising a plurality of grid elements, wherein the multi-dimensional grid has at least one of a plurality of header columns and a plurality of header rows displayed in a hierarchy, wherein each header column and header row is a dimension, and wherein each dimension comprises one or more grid elements;
searching within the multi-dimensional grid for one or more other grid elements that are associated with the at least one grid element; in response to locating the associated one or more other grid elements, a processor amending the display property of the at least one grid element and the associated one or more other grid elements; and
in response to receiving a designation to simultaneously amend a display property of a plurality of members having a same member name:
acquiring a first tuple associated with a first header cell;
searching among all tuples in the multi-dimensional grid for one or more tuples having a same member name as the first header cell, wherein a member is a grid element in a dimension that is displayed in one or more instances when expanded, wherein a header cell is located in one or more tuples, and wherein a tuple is a combination of multiple members from a plurality of dimensions; and
updating a header and a data cell within each of the one or more tuples having the same member name as the first header cell.

14. The computer program product according to claim 13, the computer readable instructions further comprising instructions for:
sending the received command to a server;
enabling a search at the server of the associated one or more other grid elements associated with the at least one grid element; and
receiving, from the server, an amendment to the display property of the associated one or more other grid elements.

15. The computer program product according to claim 14, the computer readable instructions further comprising instructions for:
making a statistics for a number of the associated grid elements, wherein the server sends the entire multi-dimensional grid with the amended display property as a new display property in response to a number of the associated one or more other grid elements exceeds a preset value; and
in response to the server sending the multi-dimensional grid with the new property:
receiving the multi-dimensional grid with the new display property at the client; and
updating the multi-dimensional grid at the client.

16. The computer program product according to claim 14, the computer readable instructions further comprising instructions for:
searching members having at least one of the same name and meaning with members represented by the amended grid elements in the same dimension hierarchy as the associated grid elements;
receiving a designation of one or more grid elements to be the associated one or more other grid elements;
storing a record of the amended display property within a storage;
in response to the multi-dimensional grid being created or rebuilt, applying the stored property to the multi-dimensional grid;
in response to the amended display property being a new size of the grid element, calculating a new position of a scrollbar according to the new size; and
updating the scrollbar according to the new position to keep a current window indicated by the scrollbar unchanged before and after amending the display property.

17. The computer program product according to claim 14, the computer readable instructions further comprising instructions for:
in response to said the display property being a size of the at least one grid element:
an upper dimension hierarchy in a same tuple; and
amending the size of the at least one grid element to the new size where the associated member exists in the upper dimension hierarchy;
wherein a member is a grid element in a dimension that is displayed within one or more instances when expanded.

* * * * *